United States Patent
Kominami et al.

(10) Patent No.: US 10,116,123 B2
(45) Date of Patent: Oct. 30, 2018

(54) INSPECTION METHOD AND APPARATUS OF SPARK PLUG INSULATOR

(71) Applicant: NGK SPARK PLUG CO., LTD., Nagoya-shi, Aichi (JP)

(72) Inventors: Shinichiro Kominami, Komaki (JP); Hajime Kawano, Konan (JP)

(73) Assignee: NGK SPARK PLUG CO., LTD., Nagoya-shi (JP)

( * ) Notice: Subject to any disclaimer, the term of this patent is extended or adjusted under 35 U.S.C. 154(b) by 44 days.

(21) Appl. No.: 15/377,030

(22) Filed: Dec. 13, 2016

(65) Prior Publication Data

US 2017/0170637 A1    Jun. 15, 2017

(30) Foreign Application Priority Data

Dec. 15, 2015 (JP) .................... 2015-244342
Jul. 13, 2016 (JP) .................... 2016-138930

(51) Int. Cl.
| | |
|---|---|
| G01B 11/02 | (2006.01) |
| H01T 13/58 | (2011.01) |
| G01B 11/08 | (2006.01) |
| H01T 13/20 | (2006.01) |
| H01T 21/02 | (2006.01) |

(52) U.S. Cl.
CPC .............. *H01T 13/58* (2013.01); *G01B 11/08* (2013.01); *H01T 13/20* (2013.01); *H01T 21/02* (2013.01); *H05K 999/99* (2013.01)

(58) Field of Classification Search
CPC ......... G01B 11/08; H01T 13/20; H01T 13/58; H01T 21/02
See application file for complete search history.

(56) References Cited

U.S. PATENT DOCUMENTS

| 6,130,498 A | 10/2000 | Shimizu et al. ............ 313/141 |
| 2005/0271263 A1 | 12/2005 | Ito et al. ............ 382/152 |

(Continued)

FOREIGN PATENT DOCUMENTS

| EP | 1 553 672 A1 | 7/2005 | ............ H01T 21/02 |
| JP | H11-242979 A | 9/1999 | ............ H01T 13/20 |

OTHER PUBLICATIONS

Extended European Search Report issued in corresponding European Patent Application No. 16 204 230.3 dated May 16, 2017.

*Primary Examiner* — Michael A Lyons
(74) *Attorney, Agent, or Firm* — Kusner & Jaffe

(57) ABSTRACT

A method of inspecting a spark plug insulator that includes a collar portion, a rear body portion located in rear of the collar portion and a leg portion located in front of the collar portion. The inspection method includes: performing measurement of a distance in a radial direction of the insulator between an outer circumferential surface of the leg portion at a first measurement point and an outer circumferential surface of the any portion of the insulator other than the leg portion at a second measurement point, wherein the measurement is performed at a plurality of positions in a circumferential direction of the insulator with no contact to the measurement target; determining, as a circular runout, a difference between maximum and minimum values among measurement results of the distance; and making pass/fail judgment of the insulator based on the determined circular runout.

4 Claims, 4 Drawing Sheets

(56) References Cited

U.S. PATENT DOCUMENTS

2007/0040487 A1* 2/2007 Kyuno .................... H01T 13/20
                                                      313/141
2011/0264406 A1  10/2011 Calame ........................ 702/155
2011/0314687 A1* 12/2011 Ozeki .................... G01B 5/003
                                                      33/613

* cited by examiner

INSPECTION METHOD AND APPARATUS OF SPARK PLUG INSULATOR

FIELD OF THE INVENTION

The present invention relates to a method and apparatus for inspection of an insulator for a spark plug of an internal combustion engine. Hereinafter, the term "front" refers to a spark discharge side with respect to the direction of a center axis of a spark plug; and the term "rear" refers to a side opposite the front side.

BACKGROUND OF THE INVENTION

A spark plug is used in an internal combustion engine for ignition of a combustible gas. In general, the spark plug has an insulator formed with an axial hole, a center electrode disposed in a front end side of the axial hole and a terminal electrode disposed in a rear end side of the axial hole. In order to maintain a certain clearance between the insulator and the other plug components such as center electrode or terminal electrode, it is required to produce the insulator within certain tolerances of circular runout. An inspection test is thus conducted in the process of production of the insulator, so as to check whether the insulator is within the certain tolerances of circular runout.

For example, Japanese Laid-Open Patent Publication No. H11-242979 discloses a technique of measuring a circular runout of a spark plug insulator by holding a front part of the insulator with a chuck, rotating the insulator about its axis and bringing a dial gauge into contact with a rear part of the insulator.

In the above-disclosed circular runout measurement technique, however, there is a possibility that the both of the front and rear parts of the insulator may sustain damage or dirt by contact with the chuck and the dial gauge. The damage or dirt on the insulator becomes a cause of problems such as through discharge and creep discharge. In addition, there has recently a demand to reduce the diameter of the spark plug. The diameter reduction of the spark plug leads to a high need for precise control of the circular runout of the front part (in particular, a leg portion) of the insulator so as to ensure the clearance between the insulator and the center electrode. It is accordingly required to protect the leg portion of the insulator from damage or dirt during the measurement of the circular runout.

In view of the foregoing, the present invention provides a technique of inspecting the circular runout of a front part (including a leg portion) of a spark plug insulator while protecting the leg portion of the insulator from damage and dirt.

SUMMARY OF THE INVENTION

The present invention can be embodied as the following application examples.

Application Example 1

In accordance with a first aspect of the present invention, there is provided an inspection method of an insulator for a spark plug, the insulator having an axial hole formed therethrough in a direction of an axis of the insulator and including a collar portion, a rear body portion located in rear of the collar portion and made smaller in diameter than the collar portion and a leg portion located in front of the collar portion and made smaller in diameter than the collar portion, the inspection method comprising:

setting a certain point in the direction of the axis on the leg portion as a first measurement point and setting a certain point in the direction of the axis on any portion of the insulator other than the leg portion as a second measurement point;

performing measurement of a distance in a radial direction of the insulator between an outer circumferential surface of the leg portion at the first measurement point and an outer circumferential surface of the any portion of the insulator other than the leg portion at the second measurement point;

causing rotation of the insulator about the axis in a state that at least one of the collar portion and the rear body portion of the insulator is held with a holding member, wherein the measurement is performed at a plurality of positions in a circumferential direction of the insulator, with no contact to the leg portion and the any portion of the insulator other than the leg portion, by changing the position of the measurement in accordance with the rotation of the insulator;

determining, as a circular runout, a difference between maximum and minimum values among results of the measurement of the distance at the plurality of positions; and making pass/fail judgment of the insulator based on the determined circular runout.

In this application example, the circular runout of the front part of the insulator is measured with no contact made to the leg portion of the insulator. It is therefore possible to protect the leg portion of the insulator from damage or dirt during the measurement of the circular runout.

Application Example 2

In accordance with a second aspect of the present invention, there is provided an inspection method according to Application Example 1, wherein the insulator includes a front body portion located between the collar portion and the leg portion and having a diameter smaller than that of the collar portion and larger than that of the leg portion; and wherein the second measurement point is set on the front body portion.

In this application example, the circular runout of the front part of the insulator is measured with no contact made to the front body and leg portions of the insulator. It is therefore possible to protect the front body and leg portions of the insulator from damage or dirt during the measurement of the circular runout.

It should be noted that the present invention can be embodied in various forms such as not only an inspection method of a spark plug insulator but also an insulation apparatus of a spark plug insulator.

The other advantages and features of the present invention will also become understood from the following description.

DETAILED DESCRIPTION OF THE PREFERRED EMBODIMENTS

The present invention will be described below with reference to the drawings.

A. Embodiment

A-1. Structure of Spark Plug

First, the structure of a spark plug 100 according to one embodiment of the present invention will be explained below.

Figure 1:
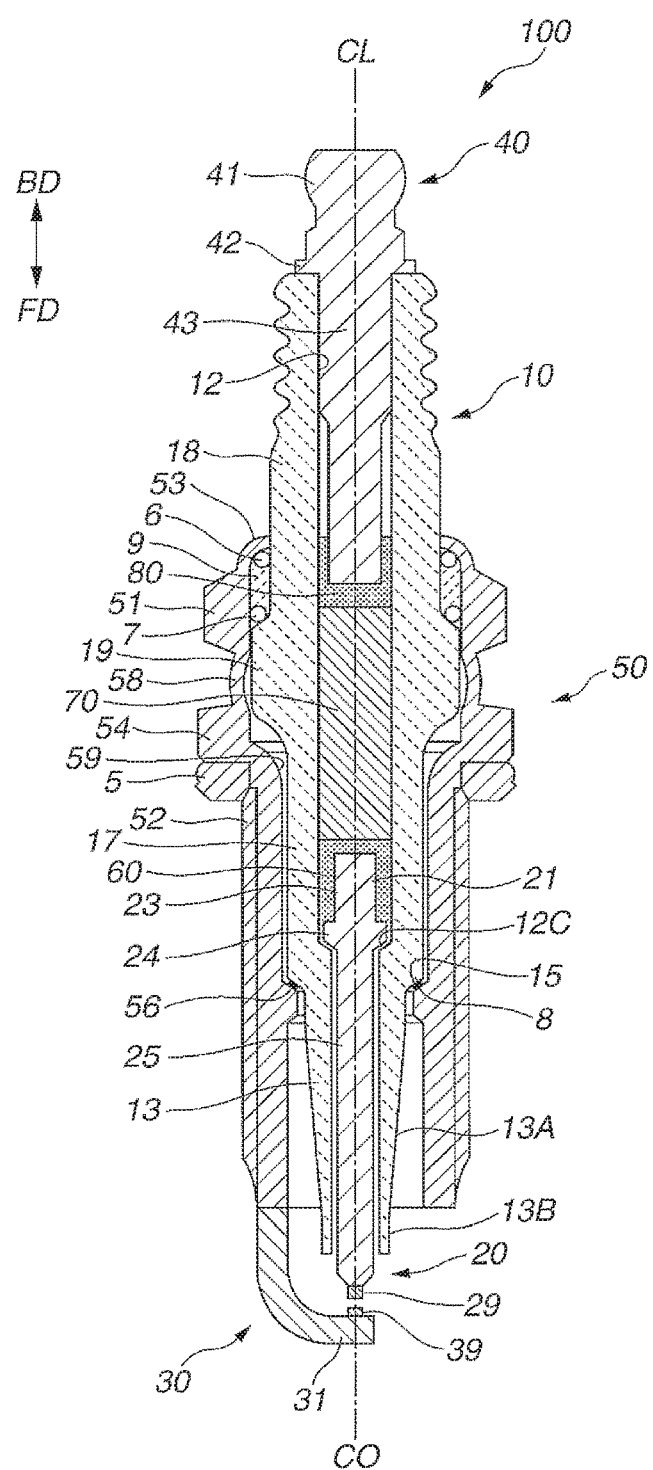
FIG. 1 is a cross-sectional view of a spark plug to which the present invention is applicable.

FIG. 1 is a cross-sectional view of a spark plug 100 according to one embodiment of the present invention. The spark plug 100 includes an insulator 10 (as an insulating member), a center electrode 20, a ground electrode 30, a terminal electrode 40 and a metal shell 50. Herein, a center axis of the spark plug 100 is in agreement with a center axis of the insulator 10 as indicated by a dashed line in FIG. 1. Both of the axis of the spark plug 100 and the axis of the insulator 10 are thus designated as "CL" in the following explanation. Further, the direction of the radius of a circle about the axis CL is also referred to as "radial direction"; and the direction of the circumference of a circle about the axis CL is also referred to as "circumferential direction". The bottom side of FIG. 1 corresponds to a "front side"; and the top side of FIG. 1 corresponds to a "rear side". The direction toward the bottom side of FIG. 1 is also referred to as "frontward direction FD". The direction toward the top side of FIG. 1 is also referred to as "rearward direction BD".

The insulator 10 is made of e.g. sintered alumina. The insulator 10 has a substantially cylindrical shape with an axial hole 12 formed therethrough in the direction of the axis CL.

As shown in FIG. 1, the insulator 10 includes a collar portion 19, a rear body portion 18, a front body portion 17, a step portion 15 and a leg portion 13. The rear body portion 18 is located in rear of the collar portion 19 and has an outer diameter smaller than that of the collar portion 19. The leg portion 13 is located in front of the collar portion 19 and has an outer diameter smaller than that of the collar portion 19. In the present embodiment, the leg portion 13 has a diameter-decreasing region 13A decreasing in diameter from the rear toward the front and a constant-diameter region 13B located in front of the diameter-decreasing region 13A and made constant in outer diameter. The front body portion 17 is located between the collar portion 19 and the leg portion 13 and has an outer diameter smaller than that of the collar portion 19 and larger than that of the leg portion 13. When the spark plug 100 is mounted to an internal combustion engine (not shown) of a vehicle, the leg portion 13 is exposed inside a combustion chamber of the internal combustion engine. The step portion 15 is formed between the leg portion 13 and the front body portion 17. Further, a diameter-decreasing step portion 12C is formed in the axial hole 12 of the insulator 10.

The metal shell 50 is made of a conductive metal material e.g. low carbon steel and is adapted to fix the spark plug 100 to a cylinder head (not shown) of the internal combustion engine. The metal shell 50 has a cylindrical shape with an insertion hole 59 formed therethrough along the axis CL. The metal shell 50 is disposed around an outer circumference of the insulator 10. Namely, the insulator 10 is inserted and held in the insertion hole 59 of the metal shell 50, with a front end of the insulator 10 protruding toward the front from a front end of the metal shell 50 and a rear end of the insulator 10 protruding toward the rear from a rear end of the metal shell 50.

The metal shell 50 includes a hexagonal column-shaped tool engagement portion 51 for engagement with a spark plug wrench, a mounting thread portion 52 for screwing into a plug hole of the engine cylinder head and a collar-shaped seat portion 54 formed between the tool engagement portion 51 and the mounting thread portion 52. The mounting thread portion 52 is formed with a nominal diameter of M8 (8 mm (millimeters)), M10, M12, M14 or M18. A diameter-decreasing step portion 56 is formed in the insertion hole 59 of the metal shell 50 at a position corresponding to the mounting thread portion 52.

An annular gasket 5, which is formed by bending a metal plate, is fitted between the mounting thread portion 52 and the seat portion 54 so as to, when the spark plug 100 is mounted to the internal combustion engine, establish a seal between the spark plug 100 and the internal combustion engine (cylinder head).

The metal shell 50 further includes a thin crimp portion 53 formed at a position in rear of the tool engagement portion 51 and a thin compression deformation portion 58 formed between the seat portion 54 and the tool engagement portion 51.

Annular ring members 6 and 7 are disposed in an annular space between an inner circumferential surface of a part of the metal shell 50 from the tool engagement portion 51 to the crimp portion 53 and an outer circumferential surface of the rear body portion 18 of the insulator 10. A talc powder 9 is filled between the ring members 6 and 7 within the annular space.

A rear end of the crimp portion 53 is radially inwardly bent and crimped onto the outer circumferential surface of the insulator 10. The compression deformation portion 58 of the metal shell 50 is compressed and deformed as the crimp portion 53 is forced toward the front by crimping during manufacturing of the spark plug 100. By such compression deformation of the compression deformation portion 58, the insulator 10 is pressed toward the front within the metal shell 50 via the ring members 6 and 7 and the talc powder 9. The metal shell 50 and the insulator 10 are consequently held together as one unit, with the step portion 15 of the insulator 10 retained on the step portion 56 of the metal shell 50. An annular metal plate packing 8 is disposed between the step portion 15 of the insulator 10 and the step portion 56 of the metal shell 50 so as to maintain a gas-tightness between the metal shell 50 and the insulator 10 and prevent combustion gas from leaking to the outside through between the metal shell 50 and the insulator 10.

The center electrode 20 has a rod-shaped center electrode body 21 extending in the direction of the axis CL and a cylindrical column-shaped center electrode tip 29 joined to a front end of the center electrode body 21. The center electrode body 21 is made of e.g. nickel or nickel-based alloy and is inserted in a front end side of the axial hole 12 of the insulator 10. The center electrode body 21 includes a collar portion 24 located at a predetermined position in the direction of the axis CL, a head portion 23 located in rear of the collar portion 24 and a leg portion 25 located in front of the collar portion 24. The collar portion 24 is supported on the diameter-decreasing step portion 12C of the axial hole 12 of the insulator 10. A front end of the leg portion 25 (i.e. the front end of the center electrode body 21) protrudes toward the front from the front end of the insulator 10. The center electrode tip 29 is made of a high-melting noble metal material and is welded to the front end of the center electrode body 21.

The ground electrode 30 has a ground electrode body 31 bent into an L-shape and joined at a base end thereof to a front end face of the metal shell 50 and a cylindrical column-shaped ground electrode tip 39 joined to a distal end portion of the ground electrode body 31. The ground electrode body 31 is made of a high-corrosion-resistant metal material (e.g. nickel alloy). The ground electrode tip 39 is made of a high-melting noble metal material and welded to a center-electrode-side surface of the distal end portion of the ground electrode body 31.

There is a spark discharge gap defined between a rear end face of the ground electrode tip 39 and a front end face of the center electrode tip 29. A part of the spark plug 100 in the vicinity of the spark discharge gap is also called a "spark discharge part".

The terminal electrode 40 is made of a conductive metal material (e.g. low carbon steel) in a rod shape and extends in the direction of the axis CL. In the present embodiment, the terminal electrode 40 includes a collar portion 42, a cap attachment portion 41 located in rear of the collar portion 42 and a leg portion 43 located in front of the collar portion 42. The leg portion 43 is inserted in a rear end side of the axial hole 12 of the insulator 10. The cap attachment portion 41 is exposed to the outside from the rear end of the insulator 10.

For the purpose of suppressing noise caused by spark discharge, a resistor 70 is arranged within the axial hole 12 of the insulator 10 at a position between a front end of the terminal electrode 40 and a rear end of the center electrode 20. A space between the resistor 70 and the center electrode 20 is filled with a conductive seal material 60, whereas a space between the resistor 70 and the terminal electrode 40 is filled with a conductive seal material 80.

The spark plug 100 is used by being mounted to the internal combustion engine of the vehicle. With the application of a direct-current voltage of about 20 kV from the terminal electrode 40 to the metal shell 50, spark discharge is generated in the spark discharge gap between the center electrode 20 and the ground electrode 30. By this spark discharge, fuel gas is ignited within the combustion chamber of the internal combustion engine.

A-2. Inspection Method of Insulator

Next, an inspection method of the insulator 10 for the spark plug 100 will be explained below.

Figure 2:
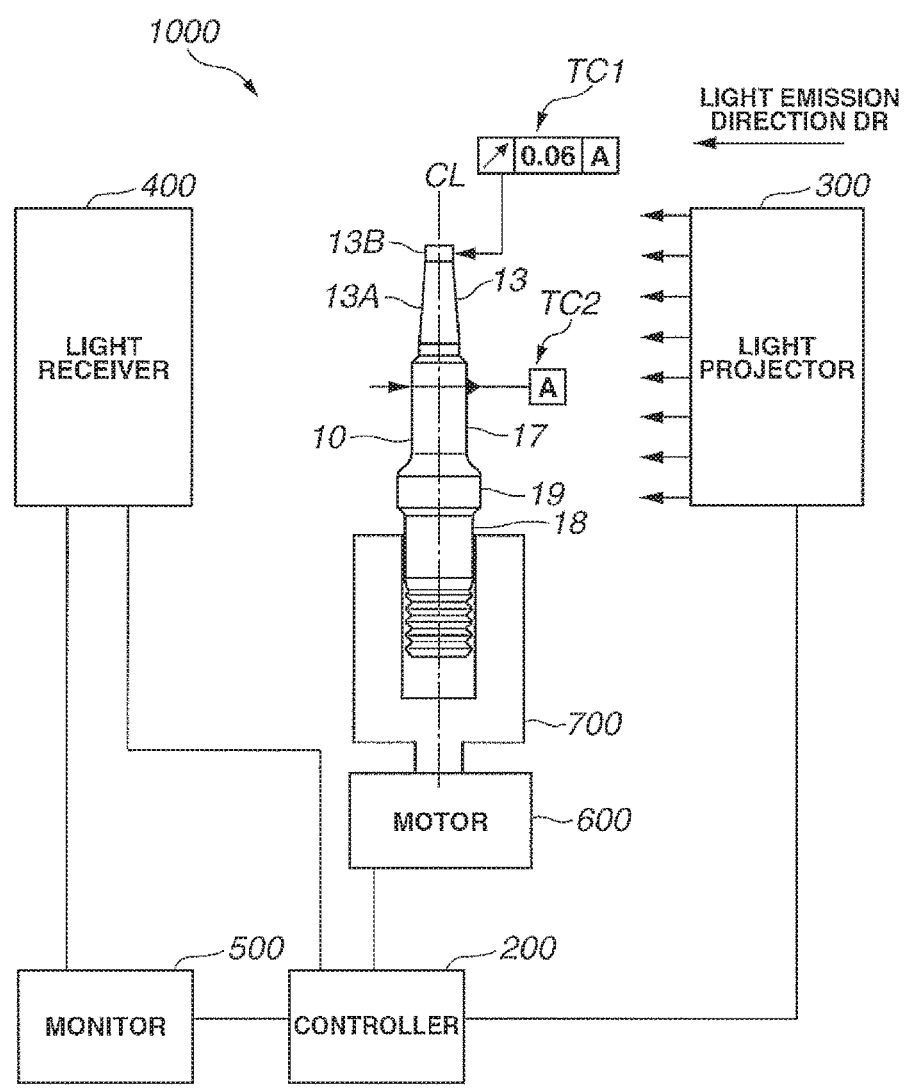
FIG. 2 is a schematic view of an inspection apparatus for conducting an inspection test on an insulator for the spark plug according to one embodiment of the present invention.

FIG. 2 is a schematic view of an inspection apparatus 1000 for conducting an inspection test on the insulator 10 in the present embodiment. In the inspection test, the circular runout of a front part of the insulator 10 with respect to the collar portion 19 is determined so as to make pass/fail judgment of the insulator 10 as a finished product. Herein, the term "circular runout" is defined according to clause 4.13 of JIS B 0621 (1984). When the determined circular runout is within a predetermined design tolerance range, the insulator 10 is judged as a passing-grade product. When the determined circular runout is not within the predetermined design tolerance range, the insulator 10 is judged as a failing product. For example, the inspection test is conducted after completion of the insulator 10 and before assembling into the spark plug 100.

In FIG. 2, examples of tolerances TC1 and TC2 of the circular runout of the insulator 10 are indicated according to Item 18.15 of JIS B 0021 (1998). In this case, a datum axis is defined by an outer circumferential surface of the front body portion 17 of the insulator 10. Ideally, the datum axis is in agreement with the axis CL of the insulator 10. The circular runout refers to, when the insulator 10 is rotated about the datum axis, the amount of displacement of a surface of the constant-diameter region 13B of the leg portion 13 of the insulator 10 at an arbitrary point relative to the datum axis in the radial direction perpendicular to the axis CL.

As shown in FIG. 2, the inspection apparatus 1000 includes a controller 200, a light projector 300, a light receiver 400, a monitor 500, a motor 600 and a clamp 700 (as a holding member).

The controller 200 performs overall control of the inspection apparatus 1000.

The light projector 300 has a light source such as LED to emit light toward the light receiver 400 under the control of the controller 200.

The light receiver 400 has an image sensor to detect the light emitted from the light projector 300.

The light projector 300 and the light receiver 400 are configured to take a projected image of the insulator 10. More specifically, the insulator 10 is arranged as a measurement target between the light projector 300 and the light receiver 400. When the light projector 300 emits light toward the light receiver 400, the light is projected onto the light receiver 400 beyond the measurement target. Based on the projected light, the light receiver 400 generates image data indicating the projected image of the measurement target (hereinafter simply referred to as "projected image data") and outputs the projected image data to the controller 200.

Further, the light projector 300 and the light receiver 400 can be provided as a single assembly unit. For example, a sensor head "TM-040" available from KEYENCE CORPORATION is utilized as the assembly unit of the light projector 300 and the light receiver 400 in the present embodiment.

The monitor 500 is connected to the controller 200 and used to display the projected image of the measurement target on the basis of the projected image data outputted from the light receiver 400.

The motor 600 is in the form of e.g. a stepping motor and is driven under the control of the controller 200 so as to cause rotation of the clamp 700.

The clamp 700 is adapted to hold the rear body portion 18 of the insulator 10 and is rotated by power of the motor 600.

By rotating the clamp 700 in a state that the rear body portion 18 of the insulator 10 is held with the clamp 700, the insulator 10 is rotated about the axis CL. The motor 600 and the clamp 700 are located such that, when the insulator 10 is held with the clamp 700, the front part (front body portion 17 and leg portion 13) of the insulator 10 is situated in a measurement area between the light projector 300 and the light receiver 400. In the present embodiment, the front body portion 17 and leg portion 13 of the insulator 10 are positioned within the measurement area such that the direction of the axis CL of the insulator 10 is perpendicular to the emission direction DR of the light from the light projector 300 to the light receiver 400.

Figure 3:
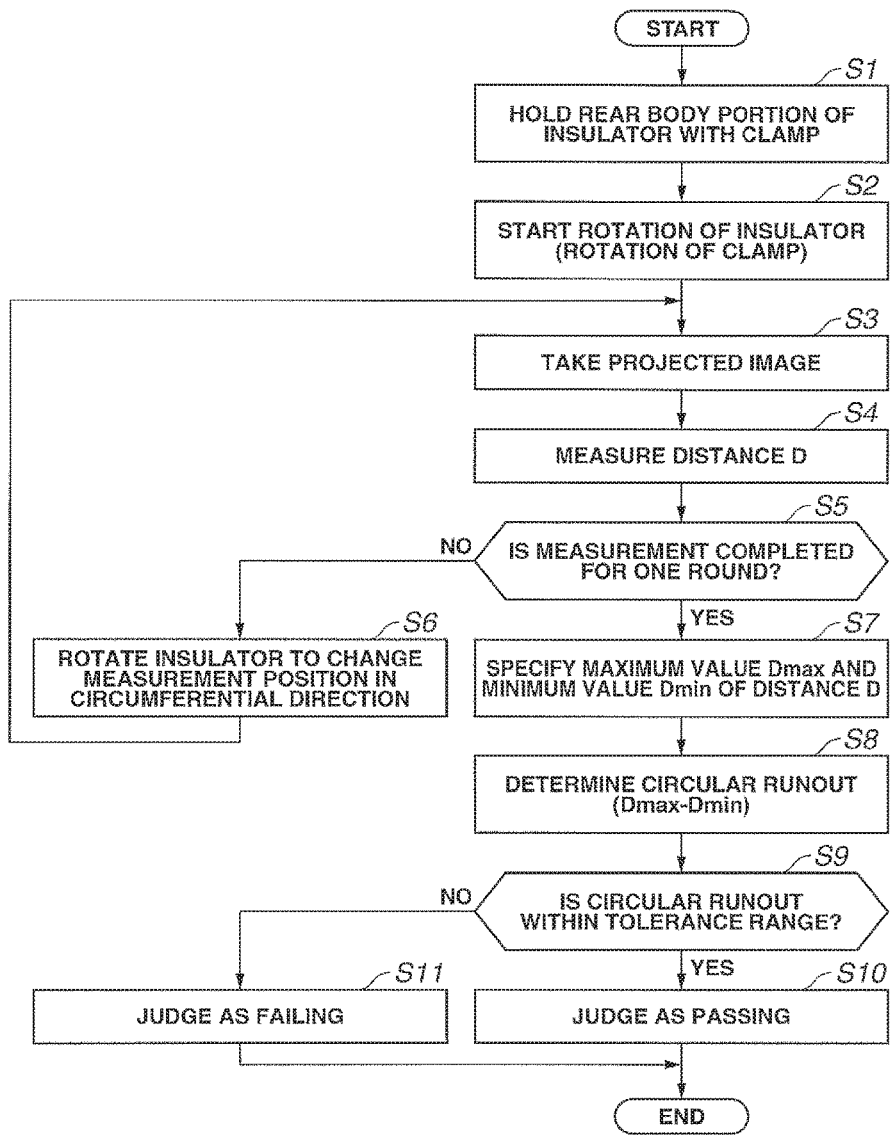
FIG. 3 is a flowchart for the inspection test conducted on the insulator by the inspection apparatus according to the one embodiment of the present invention.

FIG. 3 is a flowchart for the inspection test conducted by the inspection apparatus 1000.

At step S1, the rear body portion 18 of the measurement target insulator 10 is held and fixed with the clamp 700 such that the front body portion 17 and leg portion 13 of the insulator 10 are situated in the measurement area as mentioned above.

When an inspection command is inputted to the controller 200 by inspector's operation, the controller 200 executes the processing of steps S2 to S11.

At step S2, the controller 200 controls the motor 600 to start rotation of the clamp 700. The insulator 10 is rotated about the axis CL by rotation of the clamp 700.

At step S3, the controller 200 controls the light projector 300 and the light receiver 400 to take the projected image of the front body portion 17 and leg portion 13 of the insulator 10 and then output the projected image data to the controller 200.

Figure 4:
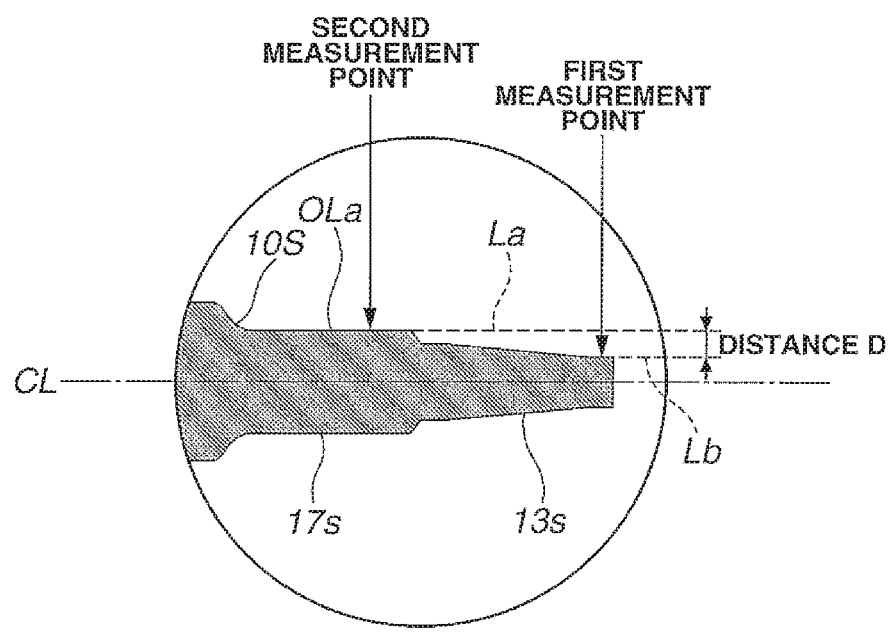
FIG. 4 is a schematic view showing an example of a projected image of a front part (including a front body portion and a leg portion) of the insulator as taken by the inspection apparatus during the inspection test according to the one embodiment of the present invention.

FIG. 4 is a schematic view showing one example of the projected image 10S of the front part of the insulator 10. In FIG. 4, portions of the projected image 10S corresponding to the front body portion 17 and leg portion 13 of the insulator 10 are designated as "17s" and "13s", respectively. The projected image 10S has a resolution capable of measuring the dimensions of the measurement target with a resolving power of several μm.

At step S4, the controller 200 measures a distance D in the radial direction between the outer circumferential surface of the insulator 10 at a first measurement point and the outer circumferential surface of the insulator 10 at a second measurement point with reference to the projected image 10S. In the present embodiment, the first measurement point refers to a certain point in the direction of the axis CL on the constant-diameter region 13B of the leg portion 13 whose circular runout is to be measured; and the second measurement point refers to a certain point in the direction of the axis CL on the front body portion 17 by which the datum axis is defined. In consequence, the distance D between the outer circumferential surface of the constant-diameter region 13B of the leg portion 13 and the outer circumferential surface of the front body portion 17 in the radial direction is measured.

The detailed procedure of the measurement of the distance D is as follows. When the insulator 10 is fixed in position and orientation relative to the clamp 700, the projected image 10S of the insulator 10 is seen in a fixed position and orientation within the image area (surrounded by a circle in FIG. 4). Thus, the controller 200 specifies and sets the first and second measurement points on the projected image 10S. The controller 200 identifies, by image processing, a plurality of points located in the vicinity of the second measurement point and indicating the outline OLa of the projected image 10S and draws an imaginary straight line La passing through the identified points (see FIG. 4). This line La indicates the location of the outer circumferential surface of the front body portion 17 in the radial direction. The controller 200 next identifies, by image processing, a plurality of points located in the vicinity of the first measurement point and indicating the outline of the projected image 10S and draws an imaginary straight line Lb passing through the identified points (see FIG. 4). This line Lb indicates the location of the outer circumferential surface of the constant-diameter region 13B of the leg portion 13 in the radial direction. Then, the controller 200 measures the distance D between these two lines La and Lb. In this way, the distance D is measured using the projected image 10S with no contact made to the front part of the insulator 10 (located in front of the collar portion 19).

It is feasible to automatically perform the measurement of the distance D by the controller 200 or to perform the measurement of the distance D by the controller 200 with inspector's operation. For example, the inspector may instruct the first and second measurement points to the controller 200 while observing the projected image 10S on the monitor 500.

At step S5, the controller 200 judges whether the measurement of the distance D has been completed for one round of the outer circumferential surface of the insulator 10. In the present embodiment, the measurement of the distance D by taking of the projected image 10S is performed at e.g. 50 positions over the outer circumference of the insulator 10, i.e., at intervals of e.g. 360/50=7.2 degrees in the circumferential direction. The controller 200 thus judges that the measurement of the distance D has been completed for one round upon finishing the measurement at all the respective circumferential positions.

When the measurement of the distance D has not been completed for one round (No at step S5), the controller 200 proceeds to step S6. At step S6, the controller 200 controls the clamp 700 to rotate the insulator 10 about the axis CL by a predetermined angle of e.g. 7.2 degrees and thereby change the position of the measurement in the circumferential direction. The controller 200 stands by until the insulator 10 becomes rotated by the predetermined angle. After that, the controller 200 proceeds back to step S3 and repeats the processing of steps S3 to S5. By these steps, the measurement of the distance D is performed at the next circumferential position.

When the measurement of the distance D has been completed for one round (Yes at step S5), the controller 200 proceeds to step S7. At step S7, the controller 200 specifies the maximum value Dmax and minimum value Dmin among the results (e.g. 50 results) of the measurement of the distance D at the above-mentioned respective circumferential positions.

At step S8, the controller 200 calculates a difference between the maximum and minimum measurement values Dmax and Dmin of the distance D and determines the calculated difference (Dmax-Dmin) as the circular runout.

At step S9, the controller 200 judges whether the determined circular runout (Dmax-Dmin) is within the predetermined design tolerance range.

When the circular runout (Dmax-Dmin) is within the design tolerance range (Yes at step S9), the controller 200 proceeds to step S10. At step S10, the controller 200 judges the insulator 10 as passing.

When the circular runout (Dmax-Dmin) is not within the circular runout tolerance range (No at step S9), the controller 200 proceeds to step S11. At step S11, the controller 200 judges the insulator 10 as failing.

The inspection result is displayed on the monitor 500 and notified to the inspector.

As explained above, the inspection apparatus 1000 performs measurement of the distance D in the radial direction between the outer circumferential surface of the leg portion 13 (in the present embodiment, the constant-diameter region 13B of the leg portion 13) at the first measurement point and the outer circumferential surface of any portion of the insulator 10 other than the leg portion 13 (in the present embodiment, the front body portion 17) at the second measurement point. In particular, the measurement of the distance D is performed at a plurality of positions, with no contact to the measurement target, by rotating the insulator 10 about the axis CL in the state that the rear body portion 18 of the insulator 10 is held with the clamp 700 and thereby changing the position of the measurement in the circumferential direction (steps S3 to S6). The inspection apparatus 1000 calculates the difference between the maximum and minimum measurement values Dmax and Dmin of the distance D and determines the calculated difference as the circular runout (steps S7 and S8). Then, the inspection apparatus 1000 makes pass/fail judgment of the insulator 10 based on the calculated circular runout (Dmax-Dmin) (steps S9 to S11).

In the case of measuring the circular runout of the leg portion 13 of the insulator 10 with the use of a dial gauge, for example, the dial gauge has to be brought into contact with the leg portion 13. The leg portion 13 may sustain damage or dirt by contact with the dial gauge. When the insulator 10 is rotated in a state that the dial gauge is held in contact with the leg portion 13, it is more likely that the leg portion 13 will sustain damage or dirt. During operation of the spark plug 100 with such an insulator 10, an electric field tends to be focused on the damage or dirt on the leg portion 13. Furthermore, the front part (in particular, leg portion 13) of the insulator 10 is smaller in thickness than the collar portion 19 and the rear body portion 18 of the insulator 10. The damage or dart on the leg portion 13 thus leads to a high possibility of a through discharge phenomenon in which a penetration (breakdown) occurs from the damage or dirt through the leg portion 13 or a creep discharge phenomenon in which a current flow occurs from the damage or dart along the surface of the leg portion 13.

In the inspection test of the present embodiment, however, the circular runout of the front part of the insulator 10 is measured with no contact made to the leg portion 13 of the insulator 10 as mentioned above. It is therefore possible in the present embodiment to protect the leg portion 13 of the insulator 10 from damage or dirt during the measurement of the circular runout and prevent the occurrence of the above-mentioned problem.

There is a tendency to reduce the thickness of the leg portion 13 of the insulator 10 in response to the demand for diameter reduction of the spark plug 100. The smaller the thickness of the leg portion 13 of the insulator 10, the more likely the above-mentioned problem will occur due to the damage or dirt on the leg portion 13. The clearance between the center electrode 20 and the axial hole 12 in the front part (e.g. leg portion 13) of the insulator 10 becomes decreased with reduction in the diameter of the spark plug 100. In order to ensure the clearance, it is demanded to precisely produce the leg portion 13. The diameter reduction of the spark plug 100 thus leads to a high need to inspect the circular runout of the front part of the insulator 10 for precise dimension control of the insulator 10. For these reasons, the inspection test of the present embodiment is particularly effective in the case where the leg portion 13 of the insulator 10 is small in thickness, i.e., in the case where the spark plug 100 is reduced in diameter.

It is conceivable to reduce the diameter of the spark plug 100 such that the leg portion 13 is formed with a relatively small diameter of e.g. 5 mm or smaller. In such a case, it is difficult to adequately bring the dial gauge into contact with the outer circumferential surface of the leg portion 13 and thereby not possible to accurately measure the circular runout of the leg portion 13 with the dial gauge. In the present embodiment, on the other hand, it is possible to accurately measure the circular runout of the leg portion 13 even when the leg portion 13 of the insulator 10 is made relatively small in diameter.

Moreover, the first measurement point is set on the leg portion 13 of the insulator 10; and the second measurement point is set on the front body portion 17 of the insulator 10 in the present embodiment. The circular runout of the front part of the insulator 10, including the leg portion 13 and the front body portion 17, is measured with no contact made to the front part of the insulator 10. It is therefore possible in the present embodiment to protect not only the leg portion 13 but also the front body portion 17 of the insulator 10 from damage or dirt during the measurement of the circular runout.

As understood from the above explanation, the motor 600 corresponds to an example of the claimed rotation unit; the light projector 300, the light receiver 400 and the controller 200 correspond to an example of the claimed measurement unit; and the controller 200 corresponds to an example of the claimed determination unit and judgement unit.

B. Modifications (1) Although the rear body portion 18 of the insulator 10 is held with the clamp 700 in the above embodiment, it is alternatively feasible to hold the collar portion 19 of the insulator 10 (rather than the rear body portion 18) with the clamp 700 or to hold both of the rear body portion 18 and the collar portion 19 with the clamp 700. Since both of the rear body portion 18 and the collar portion 19 are relatively large in thickness than the front body portion 17 and the leg portion 13, it is unlikely that the above-mentioned problem (such as penetration) will occur in the rear body portion 18 and the collar portion 19.

(2) In the above embodiment, the distance D is measured in the non-contact manner with the use of the projected image 10S. It is alternatively feasible to measure the distance D in the non-contact manner by taking an image of the front part of the insulator 10 with the use of a digital camera. Because of the higher outline resolving power of the projected image 10S, however, the measurement of the distance D with the use of the projected image 10S is advantageous in measurement accuracy as compared to that with the use of the digital camera. As another alternative, it is feasible to measure the distance D in the non-contact manner by emitting laser light to the front part of the insulator 10, detecting light reflected from the front part of the insulator 10 and measuring the time lapsed until the detection of the reflected light. The measurement of the distance D with the use of the projected image 10S is, however, advantageous in apparatus cost, measurement time and accuracy as compared to that with the use of the laser light.

(3) Although the second measurement point is set on the front body portion 17 in the above embodiment, the second measurement point may alternatively be set on the collar portion 19 or on the rear body portion 18. In general, it is feasible to set the second measurement point on any portion of the insulator 10 other than the leg portion 13. In the case where the second measurement point is set on the rear body portion 18, the projected image 10S of the front part of the insulator 10 including the front half region of the rear body portion 18 is taken in the state that the rear half region of the rear body portion 18 is held with the clamp 700.

(4) Although the first measurement point is set on the constant-diameter region 13B of the leg portion 13 in the above embodiment, the first measurement point may alternatively be set on the diameter-decreasing region 13A of the leg portion 13.

(5) The processing of FIG. 3 is merely an example. It is feasible to modify the processing of FIG. 3 as appropriate. For example, the distance D can be measured by taking a predetermined number of shots (e.g. 50 shots) of the projected image 10S at predetermined rotational intervals (e.g. 7.2 degrees) and, after taking all the shots of the projected image 10S, analyzing the respective shots of the projected image 10S. The distance D may be measured by specifying the lines La and Lb on the projected image 10S displayed on the monitor 500 as instructed by the inspector. The number of shots of the projected image 10S and the number of positions of the measurement of the distance D can be varied as appropriate depending on the required accuracy of the measurement.

The entire contents of Japanese Patent Application No. 2015-244342 (filed on Dec. 15, 2015) and No. 2016-138930 (filed on Jul. 13, 2016) are herein incorporated by reference.

Although the present invention has been described with reference to the above specific embodiment and modifications, the above embodiment and modifications are intended to facilitate understanding of the present invention and are not intended to limit the present invention thereto. Various changes and modifications can be made without departing from the scope of the present invention; and the present invention includes equivalents thereof. The scope of the invention is defined with reference to the following claims.

DESCRIPTION OF REFERENCE NUMERALS

5: Gasket
6: Ring member
8: Plate packing
9: Talc
10: Insulator
10S: Projected image
12: Axial hole
12C: Diameter-decreasing step portion
13: Leg portion
13A: Diameter-decreasing region
13B: Constant-diameter region
15: Step portion
17: Front body portion
18: Rear body portion
19: Collar portion
20: Center electrode
21: Center electrode body
23: Head portion
24: Collar portion
25: Leg portion
29: Center electrode tip
30: Ground electrode
31: Ground electrode body
39: Ground electrode tip
40: Terminal electrode
41: Cap attachment portion
42: Collar portion
43: Leg portion
50: Metal shell
51: Tool engagement portion
52: Mounting thread portion
53: Crimp portion
54: Seat portion
56: Step portion
58: Compression deformation portion
59: Insertion hole
60: Conductive seal material
70: Resistor
80: Conductive seal material
100: Spark plug
200: Controller
300: Light projector
400: Light receptor
500: Monitor
600: Motor
700: Clamp
1000: Inspection apparatus Having described the invention, the following is claimed:

1. An inspection method of an insulator for a spark plug, the insulator having an axial hole formed therethrough in a direction of an axis of the insulator and including a collar portion, a rear body portion located in rear of the collar portion and made smaller in diameter than the collar portion and a leg portion located in front of the collar portion and made smaller in diameter than the collar portion, the inspection method comprising:

setting a point in the direction of the axis on the leg portion as a first measurement point and setting a point in the direction of the axis on any portion of the insulator other than the leg portion as a second measurement point;

performing measurement of a distance in a radial direction of the insulator between an outer circumferential surface of the leg portion at the first measurement point and an outer circumferential surface of the any portion of the insulator other than the leg portion at the second measurement point;

causing rotation of the insulator about the axis in a state that at least one of the collar portion and the rear body portion of the insulator is held with a holding member, wherein the measurement is performed at a plurality of positions in a circumferential direction of the insulator, with no contact to the leg portion and the any portion of the insulator other than the leg portion, by changing the position of the measurement in accordance with the rotation of the insulator;

determining, as a circular runout, a difference between maximum and minimum values among results of the measurement of the distance at the plurality of positions; and making pass/fail judgment of the insulator based on the determined circular runout.

2. The inspection method according to claim 1,
wherein the insulator includes a front body portion located between the collar portion and the leg portion and having a diameter smaller than that of the collar portion and larger than that of the leg portion; and
wherein the second measurement point is set on the front body portion.

3. An inspection apparatus of an insulator for a spark plug, the insulator having an axial hole formed therethrough in a direction of an axis and including a collar portion, a rear body portion located in rear of the collar portion and made smaller in diameter than the collar portion and a leg portion located in front of the collar portion and made smaller in diameter than the collar portion, the inspection apparatus comprising:

a holding member that holds at least one of the collar portion and the rear body portion of the insulator;

a rotation unit that causes rotation of the insulator about the axis in a state that the at least one of the collar portion and the rear body portion of the insulator is held with the holding member;

a measurement unit that sets a point in the direction of the axis on the leg portion as a first measurement point, sets a point in the direction of the axis on any portion of the insulator other than the leg portion as a second measurement point, and then, performs measurement of a distance in a radial distance of the insulator between an outer circumferential surface of the leg portion at the first measurement point and an outer circumferential surface of the any portion of the insulator other than the leg portion at the second measurement point, wherein the measurement is performed at a plurality of positions in a circumferential direction of the insulator, with no contact to the leg portion and the any portion of the insulator other than the leg portion, by changing the position of the measurement in accordance with the rotation of the insulator;
a determination unit that determines, as a circular runout, a difference between maximum and minimum values among results of the measurement of the distance at the plurality of positions; and
a judgment unit that makes pass/fail judgment of the insulator based on the determined circular runout.

4. The inspection apparatus according to claim 3,
wherein the insulator includes a front body portion located between the collar portion and the leg portion and having a diameter smaller than that of the collar portion and larger than that of the leg portion; and
wherein the second measurement point is specified on the front body portion.

\* \* \* \* \*